(12) United States Patent
Abuelsaad et al.

(10) Patent No.: US 10,332,187 B2
(45) Date of Patent: Jun. 25, 2019

(54) INTELLIGENT INTEGRATION SYSTEM FOR PRODUCT COMPATIBILITY DETERMINATION

(71) Applicant: International Business Machines Corporation, Armonk, NY (US)

(72) Inventors: Tamer E. Abuelsaad, Somers, NY (US); Gregory J. Boss, Saginaw, MI (US); John E. Moore, Jr., Brownsburg, IN (US); Randy A. Rendahl, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 15/132,904

(22) Filed: Apr. 19, 2016

(65) Prior Publication Data

US 2017/0300996 A1 Oct. 19, 2017

(51) Int. Cl.
*G06Q 30/00* (2012.01)
*G06Q 30/06* (2012.01)
(Continued)

(52) U.S. Cl.
CPC ....... *G06Q 30/0631* (2013.01); *H04L 67/125* (2013.01); *H04L 41/5019* (2013.01); *H04L 67/02* (2013.01)

(58) Field of Classification Search
CPC .............. G06Q 30/00; G06Q 30/0601; G06Q 30/0621; G06Q 30/0623; G06Q 30/0631
See application file for complete search history.

(56) References Cited

U.S. PATENT DOCUMENTS 5,774,868 A * 6/1998 Cragun ................. G06Q 30/02
705/14.1
6,122,639 A * 9/2000 Babu ....................... H04L 12/12
(Continued)

FOREIGN PATENT DOCUMENTS

| JP | 2001069668 A | 3/2001 |
| JP | 2008089433 A | 4/2008 |
| WO | 2009066744 A1 | 5/2009 |

OTHER PUBLICATIONS

Eichelberger, Edward B., and Eric Lindbloom. "Random-pattern coverage enhancement and diagnosis for LSSD logic self-test." IBM Journal of Research and Development 27.3 (1983): 265-272. (Year: 1983).*

(Continued)

*Primary Examiner* — Christopher B Seibert
(74) *Attorney, Agent, or Firm* — Alexa L. Ashworth; Brian M. Restauro

(57) ABSTRACT

A method, computer program product and system for product compatibility determination is provided. The method includes determining information associated with monitored usage patterns of an environment for a new product, prior to purchasing the new product, and comparing specifications associated with the new product to the monitored usage patterns of the environment for the new product. The method further includes determining whether the specifications are within a threshold of the monitored usage patterns of the environment and in determining the specifications associated with the new product are not within the threshold of the monitored usage patterns of the environment, generating at least one recommendation.

17 Claims, 7 Drawing Sheets

(51) Int. Cl.
*H04L 29/08* (2006.01)
*H04L 12/24* (2006.01)

(56) References Cited

U.S. PATENT DOCUMENTS

| | | | | |
|---|---|---|---|---|
| 7,149,739 B1* | 12/2006 | Dose | G06Q 10/00 | |
| 7,899,823 B1* | 3/2011 | Trandal | G06Q 10/087 | 707/736 |
| 8,473,519 B1* | 6/2013 | Siddiqui | H04L 41/0856 | 707/791 |
| 8,773,827 B2* | 7/2014 | Kiko | H02J 3/14 | 361/62 |
| 2005/0086331 A1* | 4/2005 | Wadia | H04L 41/145 | 709/221 |
| 2006/0218634 A1* | 9/2006 | Sodhi | G06Q 30/02 | 726/22 |
| 2008/0183852 A1* | 7/2008 | Pramer | G06Q 30/02 | 709/223 |
| 2011/0196712 A1* | 8/2011 | Norelli | G06Q 10/063 | 705/7.11 |
| 2011/0302201 A1* | 12/2011 | Ogaz | G06Q 30/02 | 707/769 |
| 2012/0095783 A1* | 4/2012 | Buentello | G06Q 40/02 | 705/4 |
| 2012/0124363 A1* | 5/2012 | Dietrich | G06F 11/3442 | 713/100 |
| 2012/0316984 A1* | 12/2012 | Glassman | G06Q 10/06 | 705/26.7 |
| 2013/0211952 A1* | 8/2013 | Sugaya | G06Q 30/0631 | 705/26.7 |
| 2015/0278906 A1* | 10/2015 | Navani | G06Q 30/0631 | 705/26.7 |
| 2015/0294327 A1* | 10/2015 | Steves | G06Q 30/0224 | 705/7.29 |
| 2015/0370616 A1* | 12/2015 | Peterson | G06F 9/541 | 719/320 |

OTHER PUBLICATIONS

Alonso, R., et al. "An innovative perturb, observe and check algorithm for partially shaded PV systems." Power Electronics and Applications, 2009. EPE'09. 13th European Conference on. IEEE, 2009. (Year: 2009).*

Higuchi, Tetsuya, et al. "Real-world applications of analog and digital evolvable hardware." IEEE transactions on evolutionary computation 3.3 (1999): 220-235. (Year: 1999).*

Becker, Karin, et al. "Automatic determination of compatibility in evolving services." International Journal of Web Services Research (IJWSR) 8.1 (2011): 21-40. (Year: 2011).*

Mell et al.; "The NIST Definition of Cloud Computing"; NIST Special Publication 800-145; Sep. 2011; 7 pages.

"Multi-objective optimization"; Wikipedia, the free encyclopedia; last modified Dec. 2, 2015; pp. 1-17; <https://en.wikipedia.org/wiki/Multi-objective_optimization>.

"Tradeoff Analytics"; Printed Feb. 10, 2016; 2 pages; <http://tradeoff-analytics-demo.mybluemix.net/?cm_mc_uid=8691667397411445 4508656&cm_mc_sid_50200000=1448456339>.

* cited by examiner

INTELLIGENT INTEGRATION SYSTEM FOR PRODUCT COMPATIBILITY DETERMINATION

BACKGROUND OF THE INVENTION

The present invention relates generally to the field of management systems, and more particularly to systems and methods for determining product compatibility with an environment and providing purchase recommendations to the user.

The purchase of goods or services by a user represents a large amount of data flow into the user's home or business. At present, users manually make connection points between products and systems, which may be a cumbersome process. Furthermore, many automated solutions work with a specific brand, leaving the user with a burden to buy that brand, seek out manual integration, or take other actions.

In some cases, a user may purchase a product, and once they return home, discover that the product that was purchased doesn't fit, is a wrong color, or isn't compatible in some way with the user's environment. There is a need for automatically analyzing the environment of a user, and determining, at the time of purchasing a new device or service, whether the new device is compatible in the environment of the user, based on usage patterns in the user's environment. Further, there is a need for notifying the user in real-time of the compatibilities of a new device with the user's environment, and if the new device is not compatible in some way with the user's environment, making suggestions to the user to improve the compatibility of a new device with the user's environment.

SUMMARY

According to an embodiment of the present invention, a method for product compatibility determination is provided. The method comprises: prior to purchasing a new product, determining information associated with monitored usage patterns of an environment for the new product and comparing specifications associated with the new product to the monitored usage patterns of the environment for the new product. The method further comprises determining whether the specifications are within a threshold of the monitored usage patterns of the environment and if the specifications associated with the new product are not within the threshold of the monitored usage patterns of the environment, generating at least one recommendation.

Another embodiment of the present invention provides a computer program product for product compatibility determination, based on the method described above.

Another embodiment of the present invention provides a computer system for product compatibility determination, based on the method described above.

This may have the advantage that a user can receive an automatic, real-time recommendation about a product contemplated for purchase, based on monitored and recorded usage patterns in an environment of the user (e.g., a home or an office). Embodiments of the present invention may further have the advantage of providing a flexible apparatus for collecting information about a product or service contemplated for purchase, and integrating various plugins which can make sense of certain types of data (e.g., Internet bandwidth use, electrical circuit use and layout) for the purpose of integrating the data into a user's environment.

DETAILED DESCRIPTION

Embodiments of the present invention provide systems and methods for monitoring patterns of usage metrics in an environment, and analyzing, in real-time, whether a new service or device is compatible with the environment. Embodiments of the present invention provide systems and methods for providing real-time recommendations to a user about a product or service contemplated for purchase, based on the patterns of usage metrics recorded in an environment of the user. Embodiments of the present invention may have the advantage that a user is informed at the time of contemplating a product for purchase whether the product is compatible with the current Internet bandwidth usage and electrical usage at an intended location in their environment (e.g., a home, an office), and can maintain a level of control over a device or service by providing capabilities, such as the amount of utilities (e.g., water, gas, electric) used.

Embodiments of the present invention may have the advantage of performing the analysis of manufacturer data before and during the time of purchase, to provide the user with insight on the items compatibility, previous experience and overlap with existing inventory, and insights from the analysis provide the user with information about the product and how the product fits with the user's existing inventory. This increases the overall satisfaction with the purchase, and reduces the need for returns, exchanges, or discarding the new purchase.

Embodiments of the present invention may further have the advantage that previous and future purchases can be classified and grouped, allowing a plugin to provide the user with the compatibility of their purchase with the user's existing environment, at the time of purchase.

Figure 1:
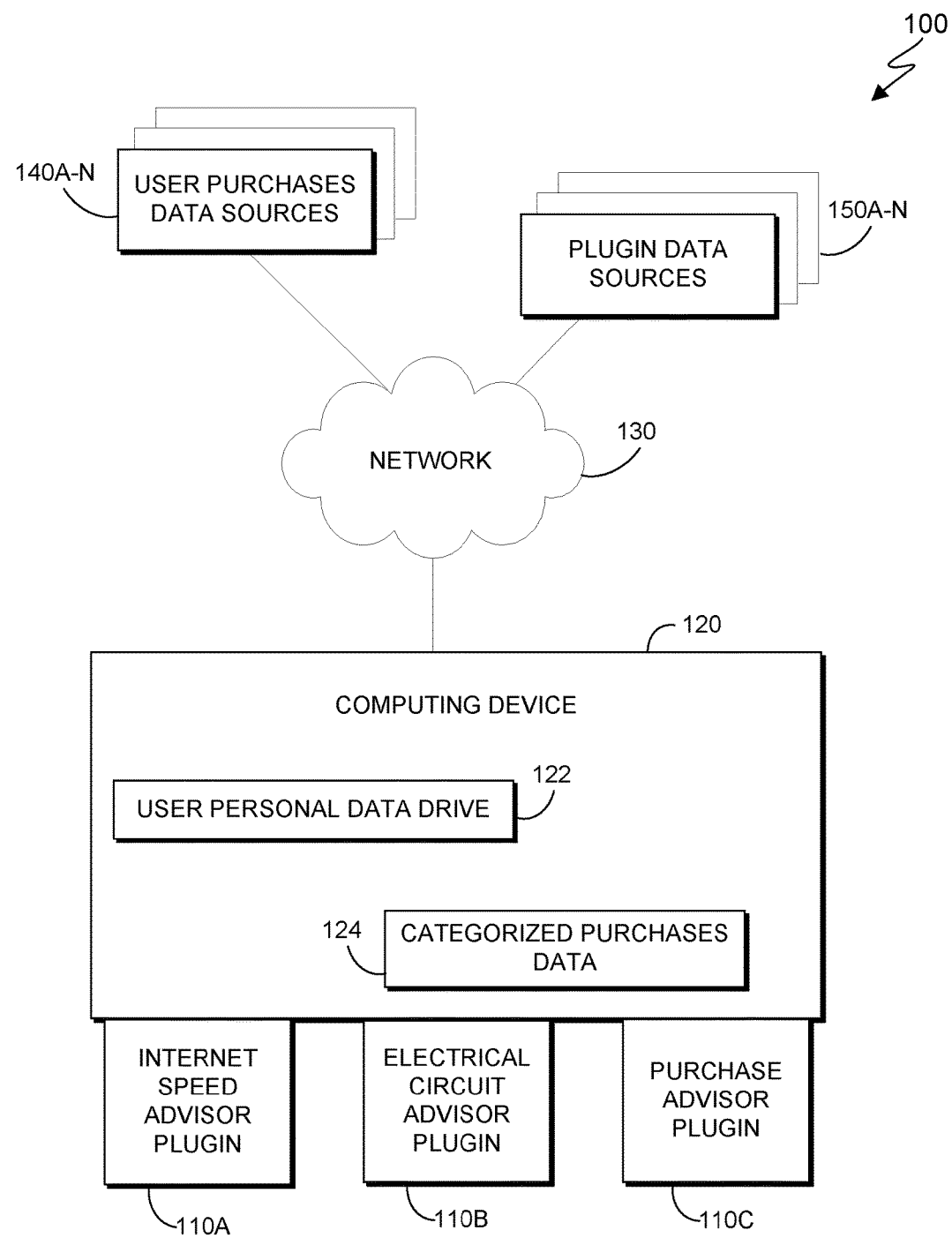
FIG. 1 depicts a functional block diagram of an intelligent integration system, in accordance with an embodiment of the present invention.

The present invention will now be described in detail with reference to the Figures. FIG. 1 depicts a functional block diagram illustrating an intelligent integration system, generally designated 100, in accordance with an embodiment of the present invention. Modifications to intelligent integration system 100 may be made by those skilled in the art without departing from the scope of the invention as recited by the claims. In an exemplary embodiment, intelligent integration system 100 includes computing device 120, plugins 110A-C, and user purchases data sources 140A-N, interconnected via network 130.

Network 130 can be, for example, a local area network (LAN), a wide area network (WAN) such as the Internet, or a combination of the two, and can include wired, wireless, or fiber optic connections. In general, network 130 can be any combination of connections and protocols that will support communication and/or access between computing device 120 and user purchases data sources 140A-N.

In this exemplary embodiment, user purchases data sources 140A-N are a plurality of different data sources, from which data pertaining to user purchases can be obtained. User purchases data sources may include, for example, point of sale (POS) purchases, courtesy cards (e.g., frequent shopper cards and loyalty cards), supplier services, and manual inputs (e.g., text, image scanning, receipt scanning). Data obtained from user purchases data sources 140A-N includes attributes such as purchase location, date, UPC, serial numbers, model numbers, and any other identifying data.

Plugin data sources 150A-N are a plurality of different data sources, from which input pertaining to specific plugins (e.g., plugins 110A-C) can be obtained. For example, an Internet speed advisor plugin may receive input pertaining to the bandwidth usage of a particular environment, in addition to data received from user purchases data sources 140A-N, in order to analyze the received data and output a recommendation to a user.

Computing device 120 includes user personal data drive 122 and categorized purchases data 124. In various embodiments of the present invention, computing device 120 can be a laptop computer, a tablet computer, a netbook computer, a personal computer (PC), a desktop computer, a personal digital assistant (PDA), a smart phone, a thin client, a wearable device, or any programmable electronic device capable of executing computer readable program instructions. Computing device 120 may include internal and external hardware components, as depicted and described in further detail with respect to FIG. 5.

User personal data drive 122 is the private data storage of a user. Data collected from user purchases data sources 140A-N is sent to user personal data drive 122, and is classified into categorized purchases data 124. Many sales systems apply a code to each transaction, as well as include a product identifier (e.g., UPC, serial number). Classification improves the grouping of newly purchased items to items that a user already owns. Classification may include various domain specific categories or labels. In some embodiments, published specifications (e.g., size, protocols, resolution, Internet bandwidth needs, cabling input/output) for purchased devices may be automatically retrieved from a specifications database of a product manufacturer. In this exemplary embodiment, user personal data drive 122 manages the awareness of tracking current assets within the system, such as Internet bandwidth use or new device purchases, and notifies one or more of plugins 110A-C when new assets are added or considered.

Plugins 110A-C facilitate easy integration between existing and new user items and provide insights. For example, plugins 110A-C can analyze the classified data and provide advice on the needs for Internet speed upgrades. Each of plugins 110A-C addresses domain specific areas and analyzes specific data categories with a specific target goal. Plugins 110A-C have the following general inputs: historic and future entries of user personal data drive 122, one or more pieces of data that came from one or more of user purchases data sources 140A-N, and product specifications available on the web from a product manufacturer. Plugins 110A-C provide the following general outputs: insights and/or actions for the user and insights which may benefit other plugins. In this exemplary embodiment, plugins 110A, B, and C are an Internet speed advisor plugin, an electrical circuit advisor plugin, and a purchase advisor plugin, respectively. In other embodiments, various additional plugins which leverage the current assets tracked by user personal data drive 122, may be implemented with intelligent integration system 100.

Plugin 110A (i.e., Internet speed advisor plugin) ensures that the purchase of devices and services which leverage the existing Internet bandwidth will function satisfactorily within the context of existing consumption models or identify the changes available and needed to make it satisfactory. Inputs to plugin 110A include: historic and future entries of the user personal data drive 122; a list of features or a model number, with minimum system requirements related to Internet bandwidth; and a profile of the average amount of available Internet bandwidth over any given time of day and day of week (which can optionally be broken down further by device). From their inputs, plugin 110A is able to output: insights as to how much Internet the device will consume (over a day, week, or month); recommendations on whether to purchase a product based on compatibility; and recommendations of an alternate product to purchase to meet an objective (inputs and outputs discussed further with respect to FIG. 2). In this exemplary embodiment, intelligent integration system 100 manages the awareness of tracking the current assets within a user environment, and notifies plugin 110A of new assets being added or considered.

Plugin 110B (i.e., electrical circuit advisor plugin) performs an electrical load assessment on existing circuits and estimates the load anticipated by a new device. Plugin 110B ensures that the purchase of a device or service will integrate with the intended environment's electrical circuit. Inputs to plugin 110B include: historic and future entries of user personal data drive 122; an existing inventory of connected devices; device specifications available on the web from a device manufacturer or other consumption information, such as Energy Star, and information from other consumers. From the inputs, plugin 110B is able to output: insights for the user; the electrical load impacts on the existing circuit load; and insights that benefit other plugins in the system.

Plugin 110C assesses current purchases or purchase options against a known history of purchases and current inventory and provides the user with relevant information when making purchase decisions. In this exemplary embodiment, inputs to plugin 110C include: historic entries of user personal data drive 122; items in the current shopping cart; manufacturer specifications regarding product descriptions, prerequisites, compatibility, and alternative products. From the inputs, plugin 110C is able to output: recommendations for alternate products based on compatibility; warnings about lacking product prerequisites; and warnings about potentially redundant product selections.

Figure 2:
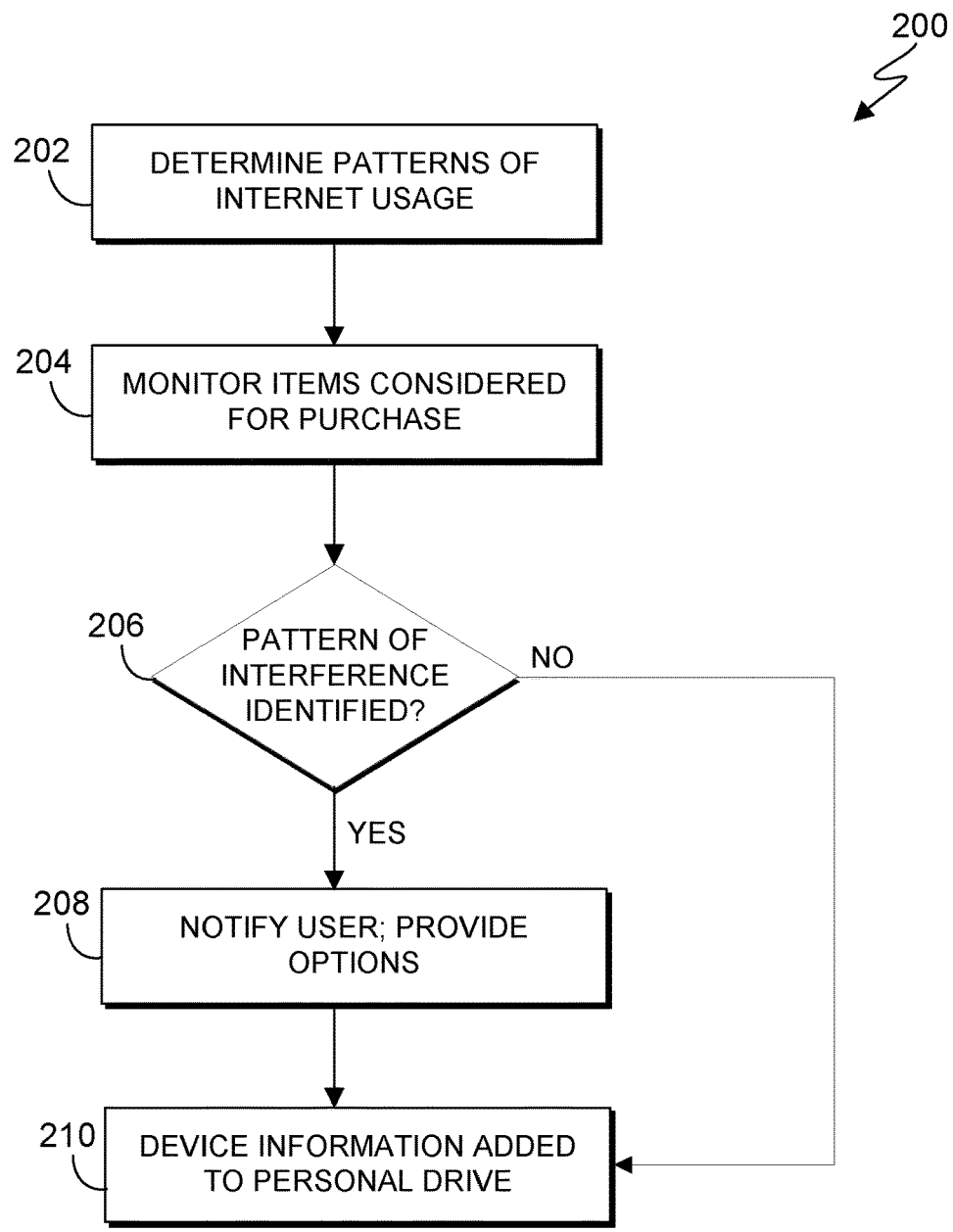
FIG. 2 depicts a flowchart illustrating operational steps for evaluating the Internet bandwidth usage of a device or service contemplated for purchase, in accordance with an embodiment of the present invention.

FIG. 2 depicts a flowchart illustrating operational steps for evaluating the Internet bandwidth usage of a device or service contemplated for purchase, in accordance with an embodiment of the present invention.

In step 202, plugin 110A determines patterns of Internet usage. In this exemplary embodiment, during the initial installation of plugin 110A, a user is prompted to enable access to the Internet bandwidth profile within an environment. It is recognized that this may be accomplished using several different approaches known in the art, for example, configuring access to the home router to monitor, track, and log historical data usage by time, date, and device, or less detailed data from the service provider showing usage by time and date. For example, a determined pattern of Internet bandwidth usage for a particular environment may be: '30 Mbps average use on Monday through Friday, from 6:00 PM until 10:00 PM.' Discovery to match the home inventory items that are Internet capable to the devices discovered through the home router integration may be accomplished either manually or automatically. The user may provide information about the current Internet provider and current service level. In this exemplary embodiment, the available providers and the service levels are discoverable by plugin 110A, based on the location, to allow for either the user to simply respond with an answer, or to provide credentials for the plugin to interact with the service provider to monitor and determine the current level of service. Once plugin 110A is installed, the system can provide immediate insights about existing Internet bandwidth consumption. By monitoring and determining the current Internet usage patterns, a threshold value of Internet bandwidth consumption at each time of day can be obtained for an environment.

In step 204, plugin 110A monitors items considered for purchase. In this exemplary embodiment, plugin 110A detects items that are being considered for purchase by the user. The detection may be accomplished in a variety of ways, including through a browser plug-in, bar code scanning, a manual input, or any other means of determining an item a user may purchase. As each device is considered, plugin 110A analyzes the Internet consumption characteristics of the device (e.g., maximum usage and normal usage information obtained from the product specifications). Plugin 110A uses existing databases which publish actual usage metrics, as well as published manufacturer minimum system requirements that specify Internet bandwidth related metrics.

In step 206, plugin 110A determines whether a pattern of interference can be identified. In this exemplary embodiment, plugin 110A maps the new requirements of the device contemplated for purchase to the existing Internet usage history, in order to determine if there would be a pattern of interference, where the new device would regularly be overloading the connection. In other embodiments, plugin 110A analyzes the worst and best case scenarios, in the case that historical data is not available.

If, in step 206, a pattern of interference is identified (i.e., a deficit in bandwidth), then, in step 208, plugin 110A notifies the user of the deficit and optionally, plugin 110A provides the user with a list of options to overcome the deficiency. For example, if the device usage level is available, a user may be prompted to identify, from a list of devices shown in conflict, any that may be replaced by the new device, or the function being hosted on the new device (e.g., the computer was the Netflix host, but the new TV will take on that role once purchased). In some embodiments, the user will be given a time pattern of deficiency to determine if the new device is going to be in use at the time of deficiency. For example, the office computer may be used heavily during workday hours, but the new TV with Netflix may not be planned to be used during the work day, when the office computer is driving heavy bandwidth usage. In this exemplary embodiment, plugin 110A can output to the user the amount of Internet speed degradation the user will encounter when purchasing and using the contemplated device or service. For example, plugin 110A may output the message "Adding this device will make the load on your Internet speed 60%, which is still okay; however, be careful of future purchases." In the case of a continued relevant pattern of usage interference, plugin 110A may provide recommendations to the user to overcome the deficiency, such as: upgrade the service level with the current service provider; select an alternate service provider; or do not purchase the contemplated device.

In step 210, plugin 110A adds the new device information to the user's personal data drive. In this exemplary embodiment, in response to the new device being added (either safely or despite warnings), the new device information is added to user personal data drive 122, as part of the normal course of purchase activity. Plugin 110A then continues to monitor additional items considered for purchase (i.e., step 204).

Accordingly, by performing the operational steps of FIG. 2, the intelligent integration system 100 can evaluate devices and/or services contemplated for purchase to determine if the devices and/or services have features which require Internet bandwidth usage, and ensure that the purchase of those devices and/or services which leverage the existing Internet bandwidth will function satisfactorily within the context of existing consumption models, or can identify the changes available and/or needed for the new device or service to function satisfactorily.

An example use of the operational steps of FIG. 2 can be described as follows. A user is shopping for a new big screen LED TV at a local membership warehouse. There are several models to choose from, and each model has different capabilities. Some TVs have built-in smart apps such as Hulu, Netflix, and Amazon Prime Video, while other TVs do not have built-in apps. The user currently has an 8 Mbps Internet connection at home. The user scans each of the TV models with their mobile device, and the Internet speed advisor plugin 110A shows the user that the smart TV with built-in Hulu and Netflix services, which the user uses regularly, will not work with the user's current home environment, because at the time of day when the user uses the smart app services, their connection is already saturated with high usage from their son's Internet gaming activity. Plugin 110A informs the user that if they buy the smart TV, it will work at-speed during the day hours, but in the evening, the user will likely see pauses while the TV shows buffer, unless the user upgrades their Internet services. Alternatively, plugin 110A recommends an LED TV that is five inches larger, at the same cost, but does not include the smart app services (e.g., Hulu, Netflix).

Figure 3:
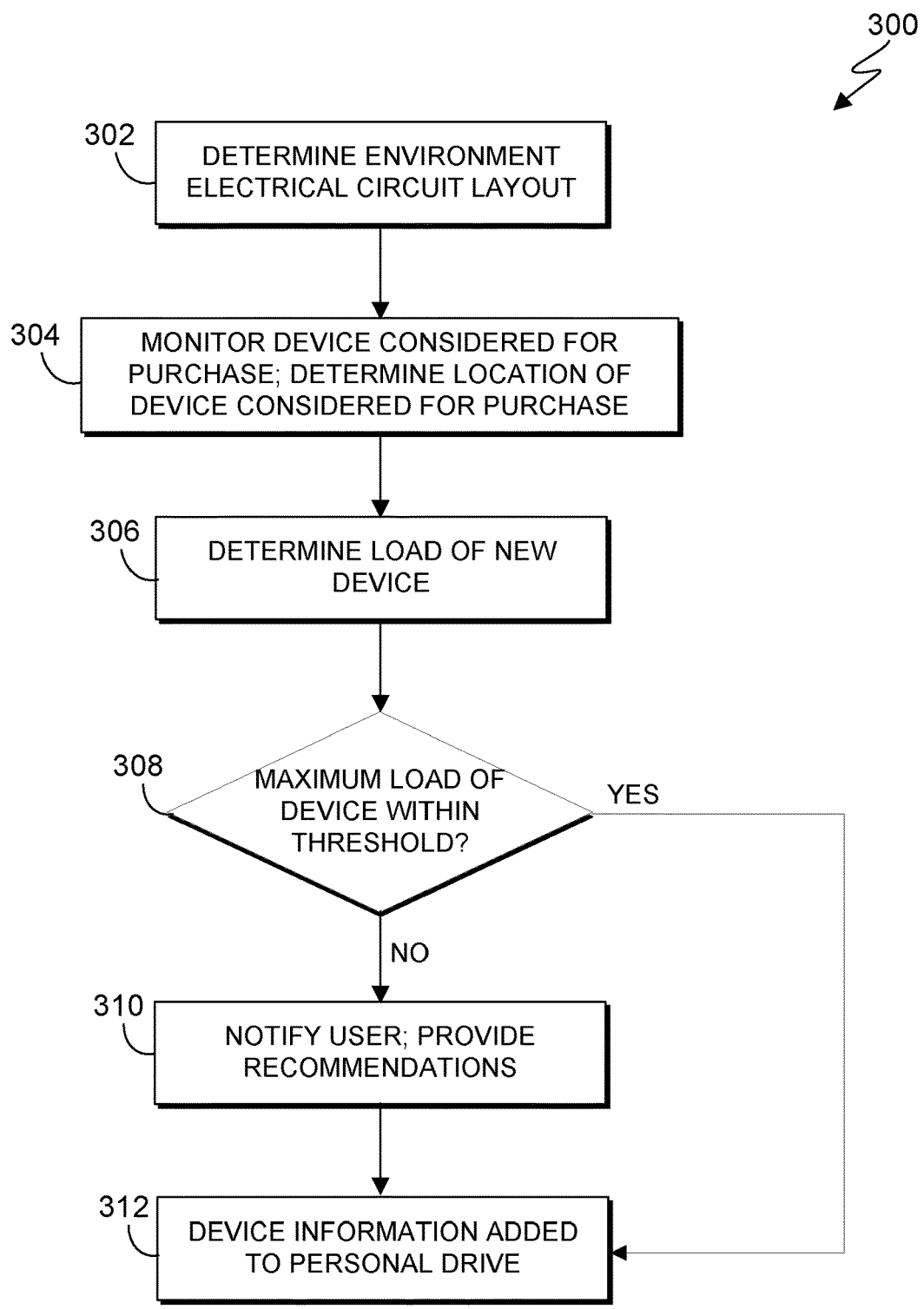
FIG. 3 depicts a flowchart illustrating the operational steps of an electrical circuit advisor plugin for estimating the electric load anticipated by a new device and providing an installation location assessment, in accordance with an embodiment of the present invention.

FIG. 3 depicts a flowchart illustrating the operational steps of an electrical circuit advisor plugin for estimating the electric load anticipated by a new device, and providing an installation location assessment, in accordance with an embodiment of the present invention.

In step 302, plugin 110B determines the environment electrical circuit layout. During setup, plugin 110B identifies the devices in a user environment and which electric circuit each device is connected to. In this exemplary embodiment, the system can infer the circuit and its amperage rating (and other characteristics) from the device type. For example, if a dryer model indicates that it requires greater than 20 Amps, then the system can infer it is connected to a 40 Amp circuit and therefore easily identify it. In some embodiments, the system can request the devices and electrical circuit layout in the user environment from the user, when it is unable to automatically perform this mapping. The level of detail provided by the user may be a list of circuits and the supported load, or a detailed list of outlets, locations, and load. In some embodiments, a user can provide the existing devices' serial numbers, model numbers, purchase receipts, and the system can identify the device, potential location in the environment, and varying ranges of electrical consumption. The system can provide immediate insights about existing devices and their potential load implications (if any). For example, the system can identify that one dryer and one iron on the same circuit may cause a circuit to short, in a particular location.

In step 304, plugin 110B monitors devices considered for purchase and determines the planned location of each device considered for purchase. Plugin 110B monitors for devices considered for purchase. In this exemplary embodiment, plugin 110B detects devices that are being considered for purchase by the user. The detection may be accomplished in a variety of ways, including through a browser plug-in, bar code scanning, a manual input, or any other means of determining a device that a user may purchase. In this exemplary embodiment, plugin 110B then identifies the planned circuit or plug for a device considered for purchase. In some embodiments, the planned circuit may be obvious, such as a dishwasher will very likely be installed in a kitchen. In other embodiments, the system may receive a planned circuit or plug to which the device will be connected, from a user (i.e., manual user input). In another embodiment, in addition to determining an expected location of a new device, the new device may be a replacement for an existing device. The system may then identify potential devices in the environment, and prompt the user to confirm the proposed parameters of the new device (e.g., a residential facility with an existing dishwasher, and the contemplated purchase is a second dishwasher). Alternatively, the user may select an existing device that will be replaced (such as an older television replaced by a new television purchase) or moved to another circuit (such as a family room television upgraded to a new television, and the original family room television is moved to a guest bedroom). In that case, the circuit in the family room, as well as the circuit in the guest bedroom, will be evaluated.

In step 306, plugin 110B determines the load of the new device. In this exemplary embodiment, plugin 110B looks up the load characteristics of the new device on a manufacturer database and/or from other consumers using plugin 110B, along with other characteristics, and determines a maximum electrical load of the new device, to determine whether the new device can be supported at the desired location in the environment. Plugin 110B can identify, and takes into account, usage and steady state issues, as well as initial start-up limitations. For example, the initial load of a laser printer may be a greater load on the circuit than the ongoing load it creates once it is warmed up.

In step 308, plugin 110B determines whether the maximum load on the circuit when the new device is included, is within a threshold.

If, in step 308, plugin 110B determines that the maximum load on the circuit is not within the threshold (i.e., above the threshold), then, in step 310, plugin 110B notifies the user and provides the user with a list of recommendations. In this exemplary embodiment, the system can identify incompatibilities in the total load, and of the new device. Based on these incompatibilities, plugin 110B can provide recommendations or alternate scenarios to the user. In some embodiments, plugin 110B can provide options to the user to extend other circuits that are near the contemplated circuit, in order to balance the load, by using an alternate circuit directly, or with modifications to, the outlets it provides. The user may be presented with values, such as a device compatibility indicator. For example, green may represent 'well within the maximum load limit'; yellow may represent 'some risk of shorting the circuit'; and red may indicate 'circuit will short'. In some embodiments, the system can provide a recommendation when there is a device incompatibility, such as i) recommending a different circuit to a user (e.g., plug the dishwasher in the living room outlet), ii) upgrading a particular circuit breaker to a higher amperage, iii) purchase a device that uses less amperage, or iv) do not purchase the device.

In other embodiments, plugin 110B can leverage cognitive systems to provide a multi-objective recommendation to the user. Plugin 110B provides multiple recommendations to the user, based on the importance of the multiple objectives, and the risks associated with each objective. A user may then select a product, with the knowledge of any and all possible impacts the product may have on the user's environment, allowing the user to augment their environment, to ensure better operation of their devices and services. A set of exemplary inputs to the cognitive system (where other objectives can be added) includes: i) current consumption usage in the user's home or business, where the usage includes electric circuit and Internet bandwidth use; ii) an initial and ongoing cost, determined for the category of products the user is interested in purchasing, such as a dishwasher or gaming system (multiple specific devices/appliances can also be input by the user); iii) the current or Internet bandwidth peak load and steady load (e.g., a vacuum has a startup load of 10 Amps and a steady load of 5 Amps); and iv) a correlation between current devices and appliances and their zone breakdowns (e.g., geographic location in the environment, such as in a floor one kitchen, a 20 Amp circuit is necessary). The user can specify the importance of each of these objectives on a sliding scale. Each item being considered for purchase is filtered, as the user adjusts the importance of each objective. The items which match the criteria are displayed, along with the risks associated with each one. For example, a system may recommend vacuum B, with the risk that if it is used in floor one while the microwave is running, the circuit breaker has a 70% chance of resetting. In another example, a system may advise that if a game controller A is purchased, and used at the same time as a current TV, then the Internet speed will degrade by 50%.

In step 312, plugin 110B adds the new device information to the user's personal data drive. In this exemplary embodiment, in response to the new device being added (either safely or despite warnings), the new device information is added to user personal data drive 122, as part of the normal course of purchase activity. Plugin 110B then continues to monitor for additional devices considered for purchase (i.e., step 304)

Figure 4A:
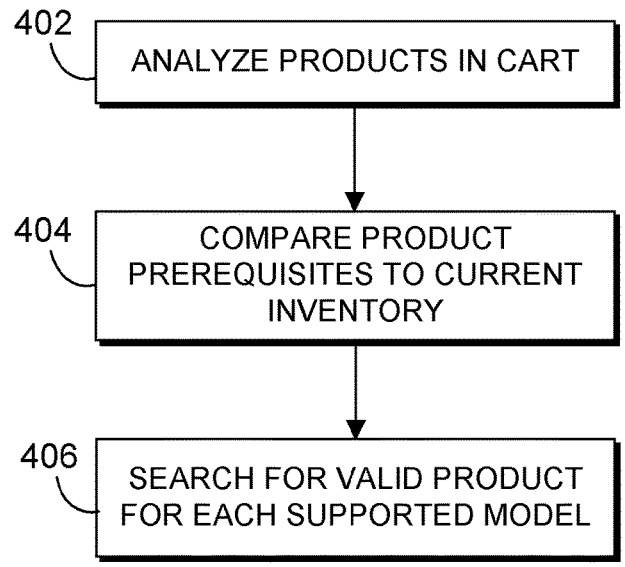
FIG. 4A depicts a flowchart illustrating the operational steps of a purchase advisor plugin for analyzing the compatibility of products contemplated for purchase with a user's existing inventory of products, in accordance with an embodiment of the present invention.

FIG. 4A depicts a flowchart illustrating the operational steps of a purchase advisor plugin for analyzing the compatibility of products contemplated for purchase with a user's existing inventory of products, in accordance with an embodiment of the present invention. During the purchase, or consideration for purchase, plugin 110C can be directly invoked by the user, or can be invoked automatically.

In step 402, plugin 110C analyzes products in a cart of the user. In this exemplary embodiment, plugin 110C analyzes each product or item in the cart of a user for product specification, which includes prerequisite models, supported models, description characteristics, and any other characteristics which help to identify the product. The cart of the user can be a physical shopping cart in a brick and mortar store, or can be an electronic shopping cart used in online shopping. As a user gathers one or more products for purchase, plugin 110C can analyze a selected product using a browser plugin (for online purchases) or by prompting the user to scan the bar code of a product as it is placed in the physical shopping cart (for brick and mortar store purchases).

In step 404, plugin 110C compares the product prerequisites to the current inventory of a user. In this exemplary embodiment, plugin 110C can provide context-specific information based on the cart contents of the user, by assessing the product, looking at the product specifications to determine compatible products, and notifying the user if the product does not match any items in the inventory.

In step 406, plugin 110C searches for a valid product for each supported model. For each supported product model, plugin 110C examines the current inventory for a valid supported product, and checks the shopping cart for a valid supported product. In the case that no supported product is located, plugin 110C, by noting the type of product, can provide one or more alternative models which may be more suitable.

In another embodiment, when the product contemplated for purchase or rental is a media product (e.g., music, video, e-book), plugin 110C examines the purchase and/or rental history to determine if the product is a duplicate product, and provide the user with a real-time warning of the prior acquisition. If plugin 110C determines that the media product is a duplicate product (i.e., previously purchased or rented), then plugin 110C notifies the user of the prior transaction in which the duplicate product was acquired. For example, a user may search through an online catalog of videos to rent, and find a video they would like to rent, forgetting that the user had previously seen this video. Plugin 110C can determine that the user has already rented the same video two years ago, and the user may then remember that they have already seen the contemplated video.

In yet another embodiment, plugin 110C can analyze the clothing characteristics of a new article of clothing, and provide a reminder to the user of the user's existing inventory of clothing which is similar to the new article of clothing. For example, a user is able to avoid making the unnecessary purchase of a new white t-shirt, because plugin 110C can provide a real-time reminder to the user that the user already owns three white t-shirts in their existing inventory of clothing.

Figure 4B:
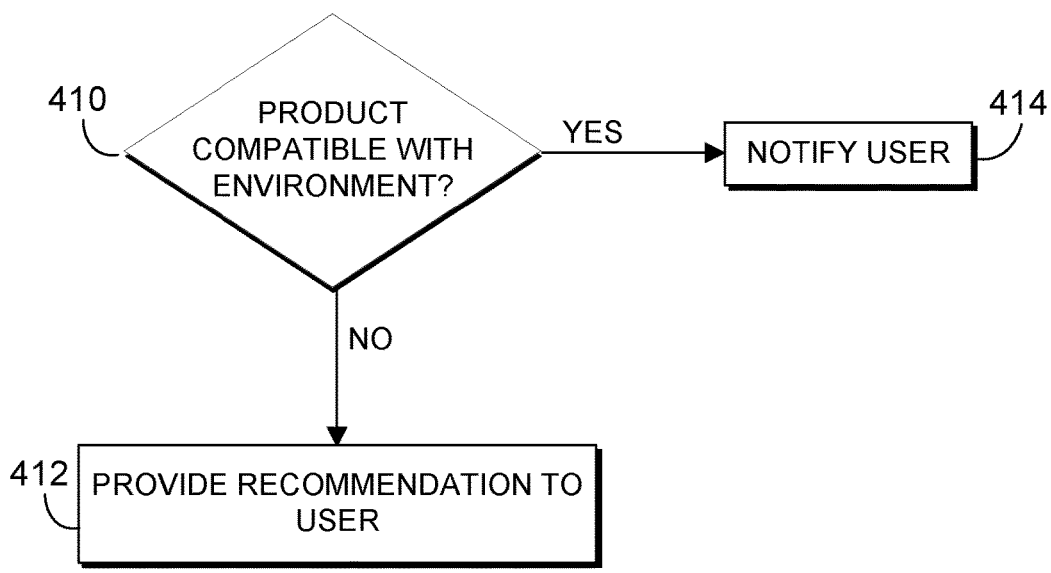
FIG. 4B depicts a flowchart illustrating the operational steps of a purchase advisor plugin for determining product compatibility and providing a user with recommendations after analyzing the compatibility of a product contemplated for purchase, in accordance with an embodiment of the present invention.

FIG. 4B depicts a flowchart illustrating the operational steps of a purchase advisor plugin for determining product compatibility and providing a user with recommendations after analyzing the compatibility of a product contemplated for purchase, in accordance with an embodiment of the present invention.

In step 410, plugin 110C determines whether a product is compatible with a user's existing environment (e.g., a home or an office). In this exemplary embodiment, after all the prerequisites have been determined, plugin 110C evaluates whether the product contemplated for purchase is compatible with the user's existing environment. If the product is compatible, then, in step 414, plugin 110C notifies the user, for example, via a smart phone application.

If, in step 410, plugin 110C determines that the product is not compatible with the current user's environment, then in step 412, plugin 110C provides recommendations to the user. In one embodiment, if the system determines that the product may overburden the existing environment (i.e., high use of resources), then a warning may be issued to the user. If the system determines that an alternative product in the same store would provide greater compatibility, then the system may output a recommendation to the user to purchase the alternative product. The user may then decide, based on any notifications from plugin 110C, whether to follow through on the purchase, replace the product with a different recommended item, or not purchase the product at all. In another embodiment, when the product is clothing, plugin 110C uses the description information to identify inventory that may be similar. The user is provided with information (e.g., a manufacturer picture) about an identified item from the inventory which may be similar. In this embodiment, the user may indicate that the item has been removed from the inventory to help manage the transient nature of clothing, as well as consider whether the new item is needed.

Accordingly, by performing the operational steps of FIGS. 4A and 4B, plugin 110C can provide timely insights during the normal process of consumer shopping by determining, at the time of a contemplated purchase, whether the product is appropriate in the environment of the user. Prior to paying for a product and bringing it to the user's environment (and potentially opening the product in a way that it cannot be returned), the product can be assessed to determine whether any prerequisite products are in the current inventory or cart, whether the supported models for a part are in the inventory or cart, and whether the product appears to be a duplicate (e.g., media duplication, clothing overlap, new duplicate products). Using an inventory of what the user currently possesses, plugin 110C can advise the user if they should purchase a particular product, what product they should buy, or prerequisites for certain products (e.g., a prerequisite for a hot stove is coil of type X).

An example use of the disclosed invention can be as follows: a manufacturing organization may be working to acquire new parts for a manufacturing line of high tech equipment, however, those who are working to acquire the new equipment are unable to anticipate the downstream negative effects that new equipment will have on the rest of the manufacturing line. The disclosed invention can analyze the proposed new equipment before it is purchased against the environment to which it will be introduced, and inform the purchaser whether it will be compatible or have unintended consequences to the manufacturing line.

In another example use of the disclosed invention, a business may be considering acquiring a site license of a software product which will be used by its entire employee population. In a typical scenario, the CIO's office may set a list of global requirements, and the people responsible for negotiating favorable contracts and terms will work to get the best deal possible. However, the employees may miss the fact that prerequisites for that particular software product deployed to thousands of employees will put an unanticipated load on their network due to new cloud features available in that software. The present invention catches this type of association between product operation characteristics and the related compatibility or load it may place on existing systems. Embodiments of the present invention can be leveraged to inform a business i) whether a proposed system will deliver; ii) whether the proposed system will deliver what it was intended to deliver; and iii) whether the proposed system will deliver the quantity expected.

Figure 5:
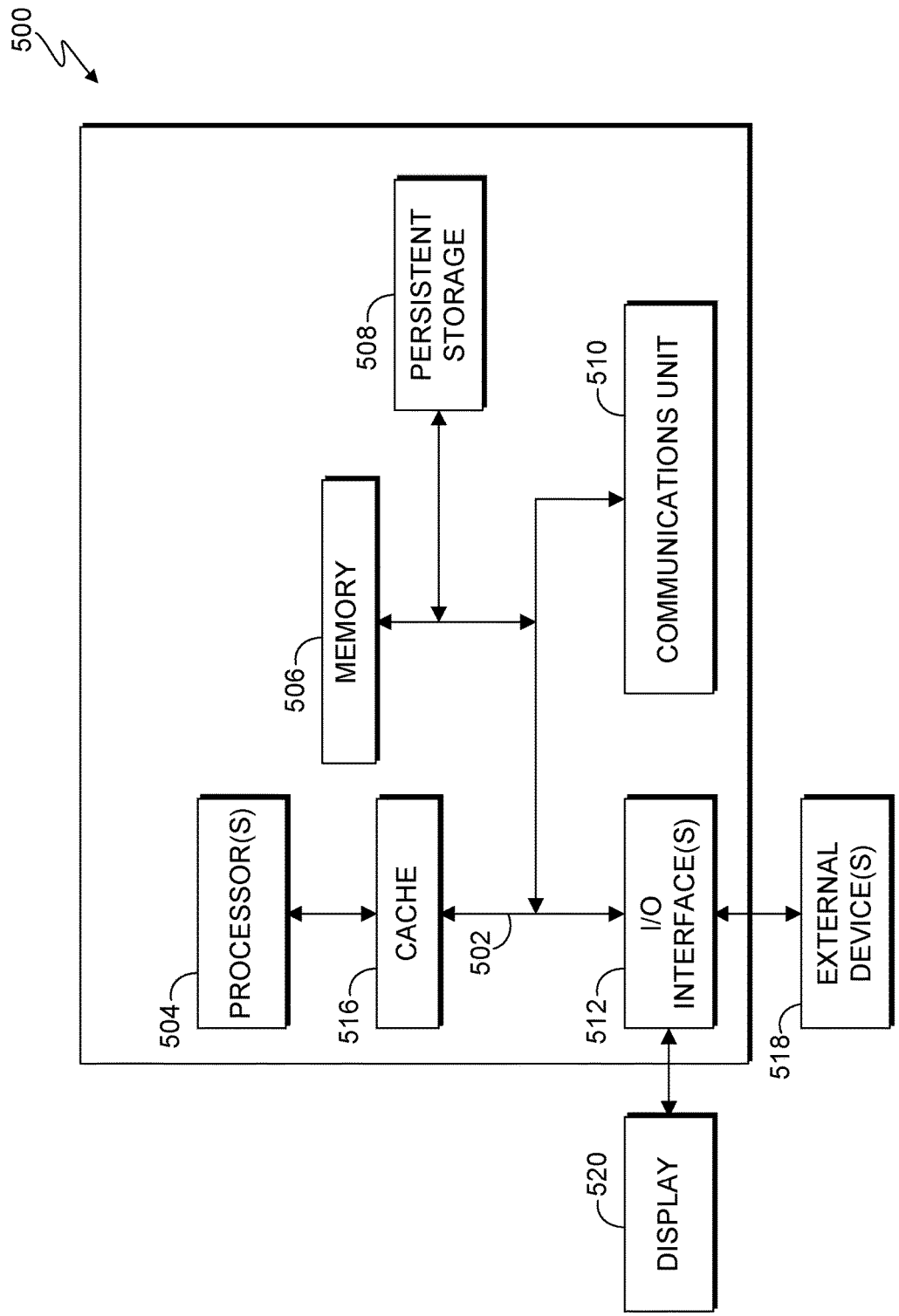
FIG. 5 depicts a block diagram of components of a computing device, in accordance with an illustrative embodiment of the present invention.

FIG. 5 depicts a block diagram of internal and external components of a computing device, generally designated 500, which is representative of components of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device 500 includes communications fabric 502, which provides communications between computer processor(s) 504, memory 506, cache 516, persistent storage 508, communications unit 510, and input/output (I/O) interface(s) 512.

Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of a network. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to computing device 500. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
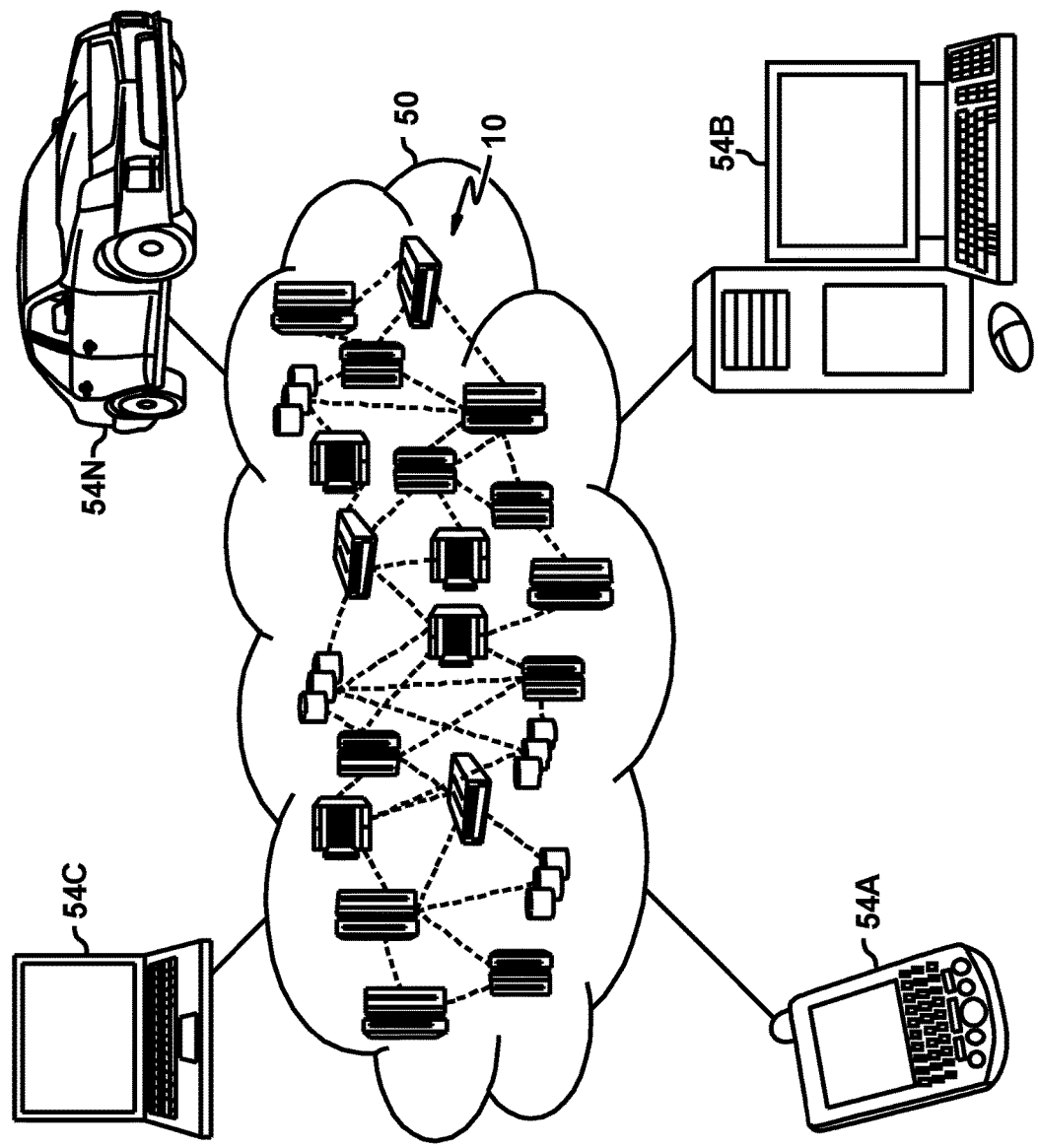
FIG. 6 depicts a cloud computing environment, according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
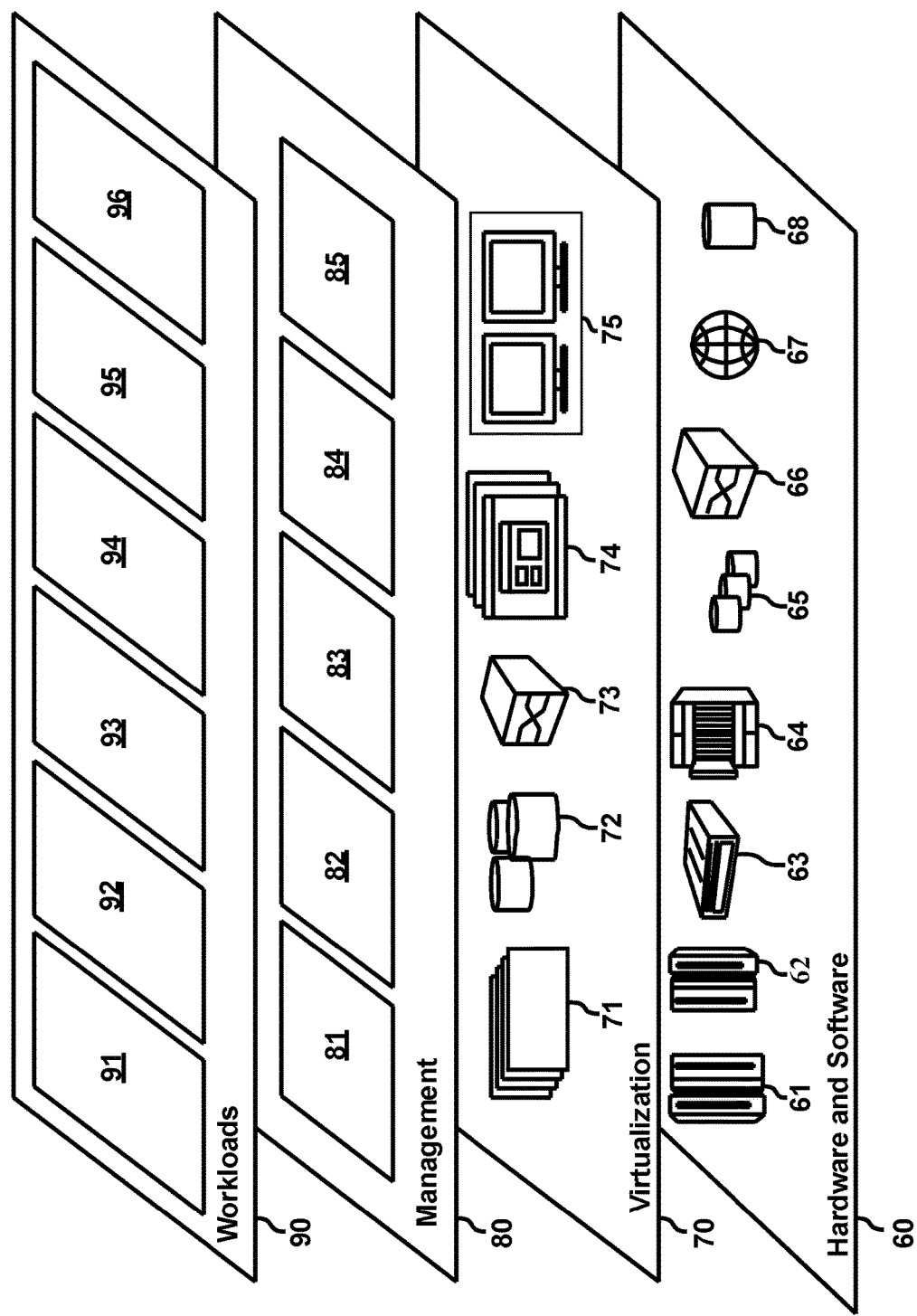
FIG. 7 depicts abstraction model layers, according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and purchases data processing 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for product compatibility determination comprising:

prior to purchasing a new product, determining, by one or more processors, information associated with monitored usage patterns of an environment for the new product stored in a user personal data drive, wherein the monitored usage patterns of the environment comprise monitored electrical circuit usage patterns, and wherein the recommendation comprises at least one of: an upgrade to an electrical circuit a different circuit to use; and another product to purchase;

comparing, by one or more processors, specifications associated with the new product to the monitored usage patterns of the environment for the new product;

determining, by one or more processors, whether the specifications are within a threshold of the monitored usage patterns of the environment by simulating pattern interference using one or more processors of an electrical circuit advisor plugin; and in response to determining the specifications associated with the new product are not within the threshold of the monitored usage patterns of the environment, generating, by one or more processors and a purchase advisor plugin, at least one recommendation.

2. The method of claim 1, wherein the monitored usage patterns associated with the environment for the new product comprise at least one of: Internet bandwidth data, point of sale purchases data, courtesy card data, supplier services data, manual input data, electrical data, and utility data.

3. The method of claim 1, further comprising:
storing, by a data drive, the information associated with the monitored usage patterns of the environment for the new product; and
classifying, by one or more processors, the information associated with the monitored usage patterns of the environment for the new product into a set of categories, wherein the set of categories are based, at least in part, on data associated with previously purchased products.

4. The method of claim 1, further comprising:
in response to detecting that a user has purchased the new product, adding, by one or more processors, the specifications associated with the new product to a data drive.

5. The method of claim 1, further comprising:
monitoring, by one or more processors, Internet bandwidth usage associated with the environment;
determining, by one or more processors, a pattern of Internet bandwidth usage associated with the environment;
analyzing, by one or more processors, an Internet bandwidth consumption of the new product; and
wherein the at least one recommendation comprises an output including an amount of Internet bandwidth degradation encountered when purchasing the new product.

6. The method of claim 1, wherein a set of electrical load characteristics of the new product are obtained from a database of a manufacturer of the new product.

7. The method of claim 1, wherein specifications associated with the new product comprise at least one of: product specifications, prerequisite models, supported models, and description characteristics.

8. A computer readable storage medium and program instructions stored on the computer readable storage medium, the program instructions comprising:
program instructions to determine information associated with monitored usage patterns of an environment for a new product stored in a user personal data drive, wherein the monitored usage patterns of the environment comprise monitored electrical circuit usage patterns, and wherein the recommendation comprises at least one of: an upgrade to an electrical circuit; a different circuit to use; and another product to purchase;
program instructions to compare specifications associated with the new product to the monitored usage patterns of the environment for the new product; program instructions to determine whether the specifications are within a threshold of the monitored usage patterns of the environment by simulating pattern interference using one or more processors of an electrical circuit advisor plugin; and
program instructions to, in response to determining the specifications associated with the new product are not within the threshold of the monitored usage patterns of the environment, generate by one or more processors and a purchase advisor plugin, at least one recommendation.

9. The computer program product of claim 8, wherein the monitored usage patterns associated with the environment for the new product comprise at least one of: Internet bandwidth data, point of sale purchases data, courtesy card data, supplier services data, manual input data, electrical data, and utility data.

10. The computer program product of claim 8, further comprising:
program instructions to store the information associated with the monitored usage patterns of the environment for the new product; and
program instructions to classify the information associated with the monitored usage patterns of the environment for the new product into a set of categories, wherein the set of categories are based, at least in part, on data associated with previously purchased products.

11. The computer program product of claim 8, further comprising:
program instructions to monitor Internet bandwidth usage associated with the environment;
program instructions to determine a pattern of Internet bandwidth usage associated with the environment;
program instructions to analyze an Internet bandwidth consumption of the new product; and
wherein the at least one recommendation comprises an output including an amount of Internet bandwidth degradation encountered when purchasing the new product.

12. The computer program product of claim 8, wherein a set of electrical load characteristics of the new product are obtained from a database of a manufacturer of the new product.

13. A computer system for product compatibility determination, comprising:
one or more computer processors;
one or more computer readable storage media;
program instructions stored on the one or more computer readable storage media for execution by at least one of the one or more processors, the program instructions comprising:
program instructions to determine information associated with monitored usage patterns of an environment for a new product stored in a user personal data drive, wherein the monitored usage patterns of the environment comprise monitored electrical circuit usage patterns, and wherein the recommendation comprises at least one of: an upgrade to an electrical circuit; a different circuit to use; and another product to purchase;
program instructions to compare specifications associated with the new product to the monitored usage patterns of the environment for the new product;
program instructions to determine whether the specifications are within a threshold of the monitored usage patterns of the environment by simulating pattern interference using one or more processors of an electrical circuit advisor plugin; and
program instructions to, in response to determining the specifications associated with the new product are not within the threshold of the monitored usage patterns of the environment, generate using one or more processors of a purchase advisor plugin, at least one recommendation.

14. The computer system of claim 13, wherein the monitored usage patterns associated with the environment for the new product comprise at least one of: Internet bandwidth data, point of sale purchases data, courtesy card data, supplier services data, manual input data, electrical data, and utility data.

15. The computer system of claim 13, further comprising:
program instructions to store the information associated with the monitored usage patterns of the environment for the new product; and
program instructions to classify the information associated with the monitored usage patterns of the environment for the new product into a set of categories, wherein the set of categories are based, at least in part, on data associated with previously purchased products.

16. The computer system of claim 13, further comprising:
program instructions to monitor Internet bandwidth usage associated with the environment;
program instructions to determine a pattern of Internet bandwidth usage associated with the environment;
program instructions to analyze an Internet bandwidth consumption of the new product; and
wherein the at least one recommendation comprises an output including an amount of Internet bandwidth degradation encountered when purchasing the new product.

17. The computer system of claim 13, wherein a set of electrical load characteristics of the new product are obtained from a database of a manufacturer of the new product.

\* \* \* \* \*